United States Patent [19]

Mechtler

[11] Patent Number: 5,038,262
[45] Date of Patent: Aug. 6, 1991

[54] DEVICE FOR SUSPENDING HANGINGS OR LIGHT FITTINGS

[75] Inventor: Georg Mechtler, Vienna, Austria

[73] Assignee: Friedhelm Bakalowits, Vienna, Austria

[21] Appl. No.: 590,605

[22] Filed: Sep. 25, 1990

Related U.S. Application Data

[63] Continuation of Ser. No. 395,366, Aug. 16, 1989, abandoned.

[30] Foreign Application Priority Data

Aug. 22, 1988 [AU] Australia .................. 2068/88

[51] Int. Cl.⁵ .................. F21S 1/04; A44B 13/00
[52] U.S. Cl. .................. 362/404; 24/598.7;
24/600.6; 248/343; 362/396; 362/406
[58] Field of Search .............. 362/368, 396, 404, 406;
248/343; 24/598.7, 598.8, 600.6, 600.8

[56] References Cited

U.S. PATENT DOCUMENTS

| D. 135,092 | 2/1943 | Biller | 362/396 |
|---|---|---|---|
| 302,509 | 7/1884 | Mauthner | 24/600.6 |
| 1,039,778 | 10/1912 | Migliavacca | 24/598.8 |
| 1,689,943 | 10/1928 | D'Olier, Jr. | |
| 1,908,587 | 5/1933 | D'Olier, Jr. | |
| 2,482,625 | 9/1949 | Kunkel | 24/600.6 |
| 2,530,518 | 11/1950 | Girard | 24/600.6 |
| 2,767,952 | 10/1956 | Wolar | |
| 2,767,953 | 10/1956 | Wolar | |
| 2,767,954 | 10/1956 | Wolar | |
| 2,826,798 | 3/1958 | Kahl | 24/600.6 |
| 3,323,770 | 6/1967 | Wolar | 248/343 |
| 3,365,759 | 1/1968 | Molzan | 24/600.8 |

FOREIGN PATENT DOCUMENTS

| 323729 | 6/1914 | Fed. Rep. of Germany . |
|---|---|---|
| 194565 | 3/1938 | Fed. Rep. of Germany . |
| 807924 | 7/1951 | Fed. Rep. of Germany . |
| 1157309 | 5/1964 | Fed. Rep. of Germany . |

Primary Examiner—Douglas Hart
Attorney, Agent, or Firm—Kuhn and Muller

[57] ABSTRACT

A device for suspending hangings on ornamental structures, especially lighting fittings, the hanging comprising an eye (2) into which a hook (4) formed on a rod (3) can be hooked and on which a bush (5) is longitudinally slidable. The bush is provided with two mutually opposite slots (6) for being placed onto the eye (2). The hook on the supporting rod is formed by a downwardly inclined straight recess (4). The eye engages this hook with a straight and level inner edge such that it does not twist relative to the rod.

7 Claims, 1 Drawing Sheet

DEVICE FOR SUSPENDING HANGINGS OR LIGHT FITTINGS

This application is a continuation of application Ser. No. 395,366, filed Aug. 16, 1989, and now abandoned.

FIELD OF THE INVENTION

The invention relates to hanger devices and more particularly to a device for suspending hangings or lighting fittings from a supporting rod, using hooks and eyes detachably secured by a bush longitudinally slidable on the supporting rod.

BACKGROUND OF THE INVENTION

It is known to suspend hangings from an ornamental structure, e.g. a lustre, by means of wire, the ends of which are twisted. These suspensions do not permit removing the hangings for cleaning, resulting in difficulties with maintenance and cleaning work.

OBJECTS AND GENERAL DESCRIPTION

It is an object of the invention to provide measures avoiding the abovementioned disadvantage and allowing the hangings to be suspended pivotally and allowing their detachment and rehanging for purposes of cleaning or maintenance, or replacement of the decoration element. At the same time the present invention provides a safeguard against inadvertent detachment of the hangings from their suspensions.

According to the invention this object is attained with a device as set out above, in that a downwardly inclined straight recess is provided in the supporting rod serving as a hook into which the eye of the hanging can be hung with an essentially upper and level inner edge. In this way the alignment is such that the eye will not twist relative to the supporting rod.

Preferably the bush comprises mutually opposite straight slots facing longitudinally by which the bush can be placed on the essentially upper outer edge of the eye such that the hanging remains pivotal in a plane.

The term "eye" is to be understood in its widest sense. It may for example take the form of a closed or open ring. Its only purpose is to permit the hook to be suspended therefrom and the bush with its slots to be placed onto the eye.

SUMMARY OF THE INVENTION

The foregoing and other disadvantages of the prior devices for suspending a hanging have been obviated by the present invention in which the support rod for the hanging is provided with a recess defining a weight bearing groove between opposite sidewalls thereof. An eye is connected to the hanging and is detachably engageable with the weight bearing groove formed within the recess thereby to prevent twisting of the eye relative to the support rod. A reciprocating member is mounted on the support rod selectively to cover and expose the recess, as desired, and contains means for releasably engaging portions of the eye which extend outwardly from the recess. In the preferred embodiment the reciprocating member comprises a sleeve which is slidably carried by the support rod. In addition, the weight bearing groove may be substantially rectilinear in a lateral direction relative to the support rod.

Further features of the invention are to be explained with reference to the drawings in which an embodiment of the device according to the invention is illustrated.

BRIEF DESCRIPTION OF THE DRAWINGS

Referring to the drawings.

Figure 1:
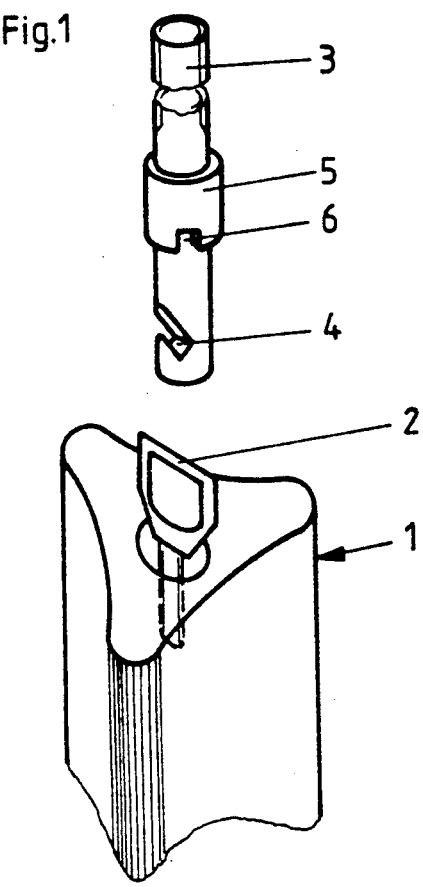
FIG. 1 is a diagrammatic view of a hanging with a supporting rod, onto which a bush has been fitted longitudinally slidable, the hanging having been lifted off.
Figure 2:
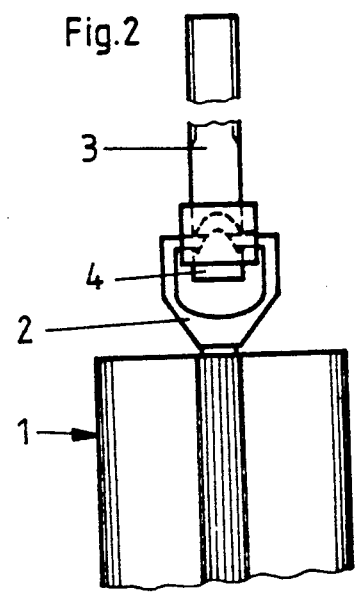
FIG. 2 is a front view of the hanging in its suspended and secured position on the rod.

DESCRIPTION OF SPECIFIC EMBODIMENT 1 designates a hanging, in this case a rod-shaped body of triangular cross section, which on its upper end has a preferably loop-shaped eye 2 connected to the body, e.g. by screwing, soldering fusion etc. The eye 2 is connected to a cylindrical support rod 3, the end of which takes the form of a hook 4. The hanging 1 is pivotally suspended with its eye 2 engaged in the hook 4 and is secured against falling out by a slide or bush 5 which on its lower edge comprises two diametrially mutually opposing slots 6. The slide 5 and is mounted longitudinally and rotationally movable on the cylindrical rod 3.

Figure 3:
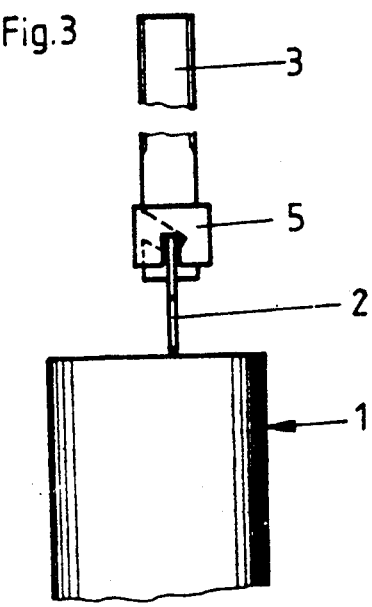
FIG. 3 is a view of the subject according to FIG. 2, turned by 90 degrees.

To secure the hanging 1 on the rod 3 the loop-shaped eye 2 of the former is hooked into the hook 4. Thereafter, the slide 5 is lowered until it rests with its slots 6 on the upper edge of the eye 2, as shown in FIG. 3 so that the eye 2 cannot slip off the hook 4 inadvertently. The eye 2 and the hook 4 are so formed that the hanging 1 in its position of use is at least partially pivotable so that it can swing freely like any normal hanging on a lighting fitting, e.g. a lustre, wall light etc. For this purpose the eye 2 consists preferably, as illustrated, of a sheet metal frame so that the eye 2, due to its flat shape, also prevents turning or twisting of the hanging 1. To this effect the hook 4 also has a planar or rectilinear support surface for the eye 2 to prevent the hanging from twisting in its suspension position, being at the most able to pivot about the support surface as axis of oscillation, normal thereto. The hanging is preferably made of crystal in order to transmit as well as reflect the rays of a lamp fitting (not shown) or other equivalent source of light.

If the hanging 1 has to be lifted off the rod 3 for cleaning, replacement or maintenance, the slide 5 is lifted until it releases the hook 4 so that the hanging 1 can be removed from the hook 4.

What we claim is:

1. A device for suspending a hanging from a support rod comprising:
   a recess formed in the support rod having a weight bearing groove defined between opposite side walls of said recess;
   an eye connected to the hanging and detachably engageable with said weight bearing groove within said recess thereby to prevent twisting of said eye relative to the support rod; and
   a reciprocating member mounted on the support rod selectively to cover and expose said recess, said reciprocating member having means for releasably engaging portions of said eye extending outwardly from said recess.

2. The device according to claim 1, wherein the eye is fitted to the top of a hanging of a lighting fitting.

3. The device of claim 1, in which said weight bearing groove is substantially rectilinear in a lateral direction relative to the support rod.

4. The device of claim 1, in which said releasably engaging means comprises a slot formed in said reciprocating member and adapted to fit over and receive therein an outwardly extending portion of said eye.

5. The device of claim 4, in which said reciprocating member comprises a pair of mutually opposed slots.

6. The device according to claim 5 wherein said slots are formed in the edge of said reciprocating member and face longitudinally in the direction of the eye, thereby enabling said reciprocal member to be placed on the essentially upper outer edge of the eye such that the hanging is secured pivotal in a plane.

7. The device of claim 5, in which said reciprocating member comprises a sleeve slidably carried by the support rod.

* * * * *